(12) United States Patent
Stössel (10) Patent No.: US 8,382,182 B2
(45) Date of Patent: Feb. 26, 2013

(54) STORAGE COMPARTMENT HAVING LID ELEMENT

(75) Inventor: Reinhold Stössel, Bodenheim (DE)

(73) Assignee: GM Global Technology Operations LLC, Detroit, MI (US)

(*) Notice: Subject to any disclaimer, the term of this patent is extended or adjusted under 35 U.S.C. 154(b) by 449 days.

(21) Appl. No.: 12/561,965

(22) Filed: Sep. 17, 2009

(65) Prior Publication Data

US 2010/0072768 A1 Mar. 25, 2010

(30) Foreign Application Priority Data

Sep. 18, 2008 (DE) .................. 10 2008 047 703

(51) Int. Cl.
*B60R 7/02* (2006.01)
*B62D 43/10* (2006.01)
(52) U.S. Cl. .................. 296/37.14; 296/37.2
(58) Field of Classification Search .................. 296/37.2, 296/37.8, 37.14
See application file for complete search history.

(56) References Cited

U.S. PATENT DOCUMENTS

| | | | |
|---|---|---|---|
| 913,159 A | 2/1909 | Petrie | |
| 1,196,087 A | 8/1916 | Crume | |
| 2,779,048 A | 1/1957 | Larabell | |
| 4,425,690 A | 1/1984 | Fraser et al. | |
| 4,860,402 A | 8/1989 | Dichtel | |
| 5,636,408 A | 6/1997 | Dichtel | |
| 6,003,921 A * | 12/1999 | Tozuka | 296/37.2 |
| 6,033,003 A | 3/2000 | Bell et al. | |
| 7,175,595 B1 | 2/2007 | Stegman | |
| 2006/0255611 A1* | 11/2006 | Smith et al. | 296/37.16 |
| 2009/0033119 A1* | 2/2009 | Suzuki | 296/37.14 |

FOREIGN PATENT DOCUMENTS

| | | |
|---|---|---|
| CH | 213218 A | 1/1941 |
| DE | 3243802 A1 | 5/1984 |
| DE | 08612162 U1 | 6/1986 |
| DE | 3916738 A1 | 11/1990 |
| DE | 09016691 U1 | 4/1991 |
| DE | 4103652 A1 | 8/1992 |
| DE | 19854365 A1 | 6/2000 |
| DE | 10112272 A1 | 10/2001 |
| DE | 102005042687 A1 | 3/2007 |
| EP | 0970851 A1 | 1/2000 |
| EP | 1048518 A1 | 11/2000 |

(Continued)

OTHER PUBLICATIONS

Machine Translation of JP11301359 printed from the JPO website, May 31, 2012.*

(Continued)

*Primary Examiner* — Jason S Morrow
(74) *Attorney, Agent, or Firm* — Ingrassia Fisher & Lorenz, P.C.

(57) ABSTRACT

A storage compartment for a motor vehicle includes a wall defining a storage space and an access opening to the storage space. A lid element has a free end unsecured to the wall and a hinged end hinged to the wall. The wall has a support area forming a protrusion and which at least partially encloses the access opening such that the free end of the lid element is disposable on the support area in a covering position to form a joint section with the support area to cover the access opening. A cover has an overlap part for covering the joint section in order to prevent penetration of objects into the joint section.

13 Claims, 4 Drawing Sheets

FOREIGN PATENT DOCUMENTS

| | | | |
|---|---|---|---|
| EP | 01196087 | A1 | 4/2002 |
| JP | S58-23782 | U * | 2/1983 |
| JP | 9254694 | A | 9/1997 |
| JP | 11301359 | A | 11/1999 |
| JP | 2000177472 | A | 6/2000 |
| JP | 2004067095 | A | 3/2004 |
| JP | 2006348999 | A | 12/2006 |

OTHER PUBLICATIONS

German Patent Office, British Search Report for British Application No. 0916134.0, Dec. 15, 2009.

German Patent Office, German Search Report for Application No. 102008047703.6, Apr. 2, 2009.

UK IPO, British Search Report for Application No. 0916134.0, dated Dec. 15, 2009.

UK IPO, British Examination Report for Application No. 0916134.0, dated Feb. 2012.

Danish Patent Office, Danish Search Report for Application No. 102008047703.6, dated Oct. 29, 2007.

* cited by examiner

STORAGE COMPARTMENT HAVING LID ELEMENT

CROSS-REFERENCE TO RELATED APPLICATION

This application claims priority to German Patent Application No. 102008047703.6, filed Sep. 18, 2008, which is incorporated herein by reference in its entirety.

TECHNICAL FIELD

The invention relates to a storage compartment for a motor vehicle, in particular for a floor area of a motor vehicle, for stowing objects. Furthermore, the invention relates to a motor vehicle having at least one storage compartment.

BACKGROUND

Trough-shaped cargo spaces which are embedded in a motor vehicle floor, and which can be covered using a lid element flush with the motor vehicle floor, are known from the prior art. The lid element is coupled via a joint to a wall of the storage space or the motor vehicle floor. Due to the flush terminus with the motor vehicle floor and the articulated connection, a joint encloses the lid element, in which dirt can collect. Other solutions use a loose support, which is laid on the wall of the storage compartment, whereby this support forms a parallel floor to the motor vehicle floor, which is not embedded but is free of joints. The problem often presents itself for the user as to how he can use both a floor mat and also the cargo compartment situated underneath it, because upon the use of a foot mat which is laid over the storage compartment, the storage compartment is no longer directly usable, because the foot mat must first be removed and later laid again upon every access to the cargo compartment. In addition, the storage compartment is not visible upon coverage with a foot mat and the user does not recognize the presence of the storage compartment.

DE 10 2005 042 687 A1 discloses a bottom cover of a cargo space of a passenger automobile, which is pivotable around a hinge access. In the basic position, the bottom cover forms the cargo floor of the cargo space, while a storage compartment, which is located below the bottom cover in the basic position, is accessible in the position pivoted upward. The solution according to DE 10 2005 042 687 A1 has a joint and is particularly suitable for the cargo space of a motor vehicle. EP 0 970 851 B1 also discloses a similar solution having a corresponding joint.

For pivoting the cover, both solutions have a handle unit integrated flush in the cover, which can be brought out of the flush position for actuation. Joints in which dirt and the like can collect, also arise here through the connection mechanism of the handle to the cover, whereby the solutions are preferably suitable for a cargo space, but not for a motor vehicle interior.

It is at least one object of the present invention to provide a storage compartment and a motor vehicle having a storage compartment, which is suitable for a motor vehicle interior and is particularly easy to clean and is less susceptible to undesired dirt accumulation. In addition, the storage compartment is to have a simple construction and is to be easy to actuate. Furthermore, complex usage of the storage compartment together with the use of a foot mat is to be prevented, so that the user does not have to decide between one of the two units, i.e., either storage box usage or foot mat usage, but rather can use both in parallel. Moreover, other objects, desirable features and characteristics will become apparent from the subsequent summary and detailed description, and the appended claims, taken in conjunction with the accompanying drawings and this background.

SUMMARY

The at least one objects, other objects, desirable features and characteristics are achieved starting from a storage compartment for a motor vehicle, in particular for a floor area of a motor vehicle interior, for stowing objects. The storage compartment includes, but is not limited to a trough-shaped or cup-shaped wall having a support area, which forms a protrusion and at least partially encloses an access opening, and a lid element, which can be laid on the support area to form at least one joint section with the support area to cover the access opening. The means are provided for covering the joint section, in order to prevent penetration of dirt or other objects into the joint section. Furthermore, the at least one object, other objects, desirable features and characteristics are achieved by a motor vehicle with this storage compartment.

The embodiments of the invention include the technical teaching that in a storage compartment for a motor vehicle, in particular for a floor area of a motor vehicle, for stowing objects, comprising: a trough-shaped or cup-shaped wall having a support area forming a protrusion, which at least partially encloses an access opening, and a lid element, which can be laid on the storage area to form at least one joint section with the protrusion to cover the access opening, it is provided that means are provided for covering the joint section in order to prevent penetration of dirt or other objects into the joint section. The storage compartment is preferably embedded as a depression in a vehicle body part, preferably trough-shaped in a foot area of a motor vehicle interior. In order that no trip hazards arise for vehicle occupants, the cargo space including lid element is implemented as terminating flush with the motor vehicle floor. For this purpose, the wall which defines the cargo space has a protrusion which forms a placement area for the lid element. The lid element can also be coupled so it is pivotable in the placement area. With this configuration, a joint section results around the lid element for easy opening of the lid element, more precisely between the edge of the lid element and the wall/protrusion. In order to prevent dirt or other things from collecting in the joint section, which can be implemented as peripheral around the lid element, means are provided for covering the joint section, preferably in the direction of the vehicle interior.

In a preferred embodiment of the invention, it is therefore provided that the means have an overlap part, which at least partially covers the joint section in a covering position of the lid element. The overlap part is dimensioned such that it at least partially, preferably completely covers the joint section. For this purpose, the overlap part can be implemented as flexible. For example, the overlap part is implemented as extendable, in order to adapt it to various joint widths.

In a further embodiment, it is provided that the overlap part is integrated in the lid element. For this purpose, the lid element can have a corresponding shaped area or the like, which has a thickness reduced relative to the lid element, for example. The shaped area can be implemented as integrated with the lid element via a film hinge, for example. One overlap part can be implemented on the lid element or multiple adjacent overlap parts may be implemented on the lid element. The overlap parts may partially mutually overlap.

A further embodiment therefore provides that the means comprise a cover, which is situated on the lid element on a side facing away from the wall and/or the cargo compartment. The cover protrudes beyond the lid element at least in the plane of a motor vehicle floor, at least so that at least a part of the joint section is concealed. The cover can be a foot mat, for example, which is situated on the lid element. In this way, the lid element may additionally be designed as more visually appealing. The cover is situated so that it does not have to be removed upon usage of the cargo compartment, but rather can remain on the lid element. For this purpose, the cover is fastened correspondingly to the lid element.

In a further embodiment of the present invention, it is provided that the overlap part is implemented as integrated on the cover. The overlap part can be provided in addition to an overlap part implemented as integrated on the lid element. One overlap part can be provided or multiple overlap parts may be implemented on the cover. The overlap part can form a part of a foot mat or be implemented as a part joined to the foot mat, for example.

A further embodiment of the present invention provides that the cover is detachably connectible to the lid element via a connector. In this way, the cover can be varied for different motor vehicles independently of the lid element. Various motor vehicle embodiments may be taken into consideration in this way. In addition, upon wear of the cover, it can be replaced, exchanged, or removed for cleaning and attached again easily.

In order to implement simple removal and attachment of the cover to the lid element, it is provided in one embodiment that the connector comprises a buckle, which is attachable essentially positively to the cover, having a floor detent medium. The floor detent medium is used for the slip-proof fastening of the cover on the motor vehicle floor or the lid element. The floor detent medium can be integrated in the clamp or can be implemented as a separate section of the clamp. The floor detent medium preferably works together positively with the lid element or the motor vehicle floor and may be clipped thereto, for example. The buckle works together essentially positively with the cover, for example, the foot mat. A substantial force action, for example, by engaging teeth or clamping, is not provided. In the positive mode of operation, the shape of the buckle is adapted to the cover. For example, a part of the buckle wraps around an edge of the cover, so that it works together positively with the buckle. The buckle preferably has multiple positive means, in order to attach the cover so it is slip-proof on the lid element in multiple directions.

A further embodiment of the present invention provides that the clamp has two leg areas acting essentially in opposing directions, in order to implement a secure hold of the cover. The legs work together positively with the cover. On the one hand, this can be implemented by an enclosure of a part of the cover by the buckle, so that the buckle is adapted to an external contour of the cover. This can be implemented, for example, by a corresponding receptacle, which is adapted to the edge of the cover. This can also be implemented by a projection or the like, which engages in a special shaped area of the cover, such as a through opening, a slot, or a hole of the cover. The projection or the shaped areas are implemented so that they effectively prevent dirt from passing through into the interior of the storage compartment. Thus, for example, the cover can be implemented having multiple shells, only the uppermost shell facing toward the vehicle interior having a corresponding projection or a recess. The various legs are implemented so that they act in different directions in order to situate the cover so it is to slip-proof. One leg can have a degree of freedom in the direction of an edge of the cover, for example, while in contrast the second leg particularly does not have the degree of freedom in the direction of the edge, for example, by being inserted through the shaped area. The buckle implemented as a holder can be put easily on the cover, for example, the foot mat or floor mat, without a special tool being required for the installation. The buckle is connected positively to the floor mat, so that, for example, one leg of the buckle is put on one edge of the cover and the other leg is put in a slot of the floor mat. The length of the slot is preferably approximately equal to the width of the leg. The leg has a hooked end on its lower end. This hook is implemented for the purpose of being put in a corresponding slot of the motor vehicle floor and/or the lid element. Multiple buckles may be provided. In further embodiments, it can be provided that the tip of the hook preferably points in the travel direction of the vehicle. Furthermore, a second buckle can preferably be installed opposite to the first buckle (i.e., on the opposing side of the cover/floor mat). More than two buckles may be provided. One leg of the buckle preferably not only presses against the outer edge of the floor mat, but rather encloses the edge in a U-shape. Furthermore, the buckle implemented as a holder can be implemented as eye-catching, in that it is chromed or has a special shaping, for example. The buckle can be provided with symbols such as logos and similar symbols. In addition, the buckle can also be inserted into other lining parts besides a floor lining, for example, into a rocker panel lining. The position of the slots and/or the slots themselves may be marked in the floor lining, for example, by colored spots or heat deformations. The markings support cutting into the floor lining, on the one hand, and finding of the insertion position when the floor mat is installed again after a removal from the vehicle, for example, on the other hand. In addition, the slots in the floor lining may be closed by covers, lids, or caps made of plastic, for example, if the vehicle prepared for the installation of floor mats is to be used without a floor mat. The caps may be slotted so that the hooks of the holders may be inserted through them (i.e., the caps may remain in the vehicle independently of whether the vehicle is used with or without floor mats). The positions for the incisions may be determined with the aid of templates, which are provided together with the installation set of the floor mat, for example. Via the incisions in the floor lining, such as a carpet, which are already introduced upon delivery, for example, the foot mats may be fastened with the corresponding holders therein. The holders are then inserted using the corresponding leg in at least one slot. In this way, a cover such as a foot mat may be fastened easily, the cover also being able to be used without a cargo compartment situated underneath it. If the slots are not provided upon delivery, they may be implemented later, for example, with the aid of a template. The template can be a component of a retrofitting set having foot mat and template. Alternatively, corresponding markings may also be provided on the floor lining, at which the slots for using a foot mat may be formed. The holder implemented as a buckle has legs shaped appropriately for the engagement in the slots.

The following advantages result in particular through the implementation of the buckle: Overall, the functionality and the durability of the floor mat in a motor vehicle are improved. The hooks which are angled downward may absorb higher forces laterally to the travel direction. The hooks which are directed forward may absorb greater forces in the travel direction. This means that the forces which the vehicle user typically applies when supporting his feet on the floor mat are absorbed better than using the holders according to the prior art. An improvement of the vehicle safety results in particular in this way. In addition, the production effort is reduced, because provisions in the floor covering for fastening floor mats may be reduced. The floor mats may be retrofitted easily using the buckles according to the invention. The provisions in the floor covering or the floor lining for fastening floor mats may be minimized (e.g., to two incisions). In addition, the buckles cause a visual improvement of the vehicles in the area of the foot or floor mat, because additional hooks, eyes, bolts, or other elements may be dispensed with. Instead of shapeless holders, holders having an attractive shape which is adapted to the appearance of the motor vehicle may be used. The effort for attaching logos and the like to the floor mat, for example, by embroidering, may be dispensed with therein (i.e., it may be replaced by logos, etc., on the holders).

Still a further embodiment of the present invention provides that the means comprise a handle element which can be situated protruding from the joint section, in order to implement grasping of the lid element essentially without joint sections. The handle element preferably protrudes in an area of the foot well at which it does not annoy the occupants. The handle element is preferably implemented as a flexible element, which does not form a trip hazard. Because the handle element protrudes permanently, it is not necessary to house it in joint sections and the like, so that no dirt can collect here.

A further embodiment of the present invention provides that the handle element is connected to the cover and/or the lid element. The handle element can be situated on the cover, on the lid element, or on both, for example, between cover and lid element. Corresponding fasteners are provided for this purpose. The handle element can be implemented as a separate component. Alternatively, the handle element can be implemented as integrated in the lid element or the cover.

Still another embodiment of the present invention provides that the lid element is connected via joint means to the wall so it can be opened, in order to implement an access through the access opening by folding up the lid element. The lid element thus does not have to be removed completely upon opening, but rather always remains on the cargo compartment. The joint means are preferably situated on the lid element and/or the cover for this purpose. In a preferred embodiment, the joint means are implemented like a film hinge having an intended buckling area. In this way, a space-saving articulated connection may be implemented. In order to remove the lid element completely for a better access to the cargo space, for example, it is provided that the joint means are implemented as detachable, in order to remove the lid element and/or the cover from the wall.

The embodiments of the invention additionally include the technical teaching that at least one storage compartment according to the invention is provided in a motor vehicle. In this way, a cargo space may be enlarged in a motor vehicle in a space-saving way, so that objects may be situated housed safely for traffic. The storage compartment is preferably situated in a motor vehicle interior and in a foot area therein.

Further measures which improve the invention are disclosed in claims and subclaims or result from the following description of exemplary embodiments of the invention, which are schematically shown in the figures. Uniform reference numerals are used for identical or similar components or features therein. Features or components of various embodiments may be combined in order to thus obtain further embodiments. All features and/or advantages arising from the claims, the description, or the drawings, including design details, spatial configurations, and method steps, may be essential to the invention both alone and also in greatly varying combinations.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
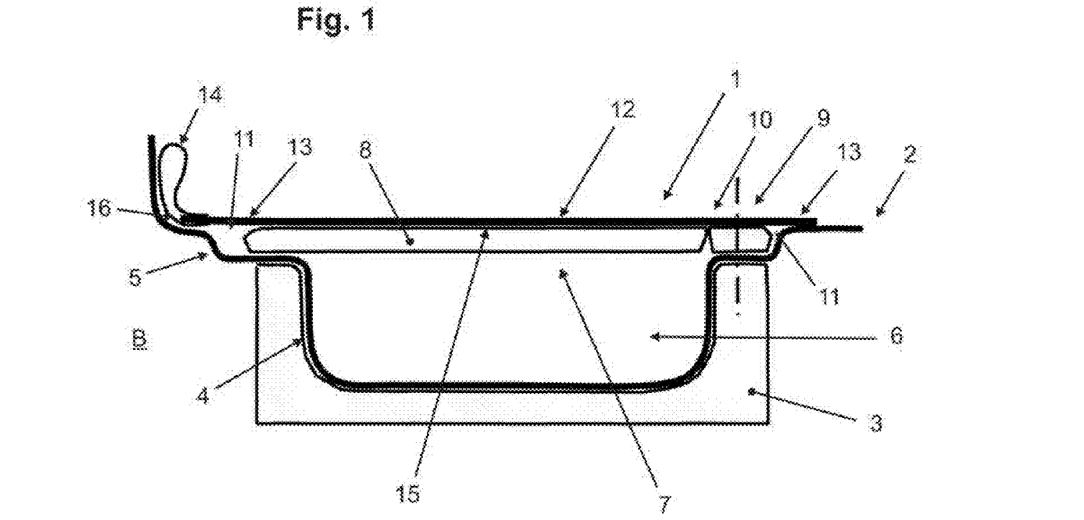
FIG. 1 schematically shows a detail of a floor area of a motor vehicle having a storage compartment according to an embodiment of the invention in a closed position in a cross-sectional view.

FIG. 1 schematically shows a detail of a floor area B of a motor vehicle having a storage compartment 1 according to an embodiment of the invention in a closed position in a cross-sectional view. The storage compartment 1 is embedded in a motor vehicle floor 2 and comprises, in addition to a molded shell 3, a cup-shaped or trough-shaped wall 4. The wall 4 has a support area 5, which forms a protrusion, on an area situated adjacent to the motor vehicle floor 2. A cargo compartment having a corresponding cargo space 6 is formed by the wall 4, which is accessible via an access opening 7. The storage compartment 1 is shown in a closed position. The storage compartment 1 has a lid element 8 for closing the access opening 7. The lid element 8 is implemented as approximately plate-shaped and rests on the support area 5. On one side, the lid element 8 is articulated with the storage compartment 1, more precisely with the wall 4, via a joint means 9. In the present case, the joint means 9 is implemented as a film hinge having an intended buckling area 10. A peripheral joint section 11 is implemented around the lid element 8, in which dust and the like can collect. In order to protect the joint section 11 from dust accumulation, the lid element 8 has corresponding means, which cover the joint section 11. The means are implemented in FIG. 1 as a cover 12 having an overlap part 13. The joint means 9 can be integrated in the overlap part 13. Access in the joint section 11 is not possible or is only poorly possible through the overlap part 13. In order to nonetheless pivot the lid element 8, a handle element 14 is provided, which protrudes from the cover 12, which is implemented in the present case as a foot mat. The handle element 14 is implemented as a flexible loop, which is connected via connectors 16 to the cover 12, which is in turn connected via suitable connectors 15 to the lid element 8. The connectors 15 and 16 may be implemented as integrated (i.e., the handle element 14 is attached using common connectors to the cover 12 and the lid element 8, for example, using a screw connection which at least partially penetrates the cover 12 and the lid element 8).

Figure 2:
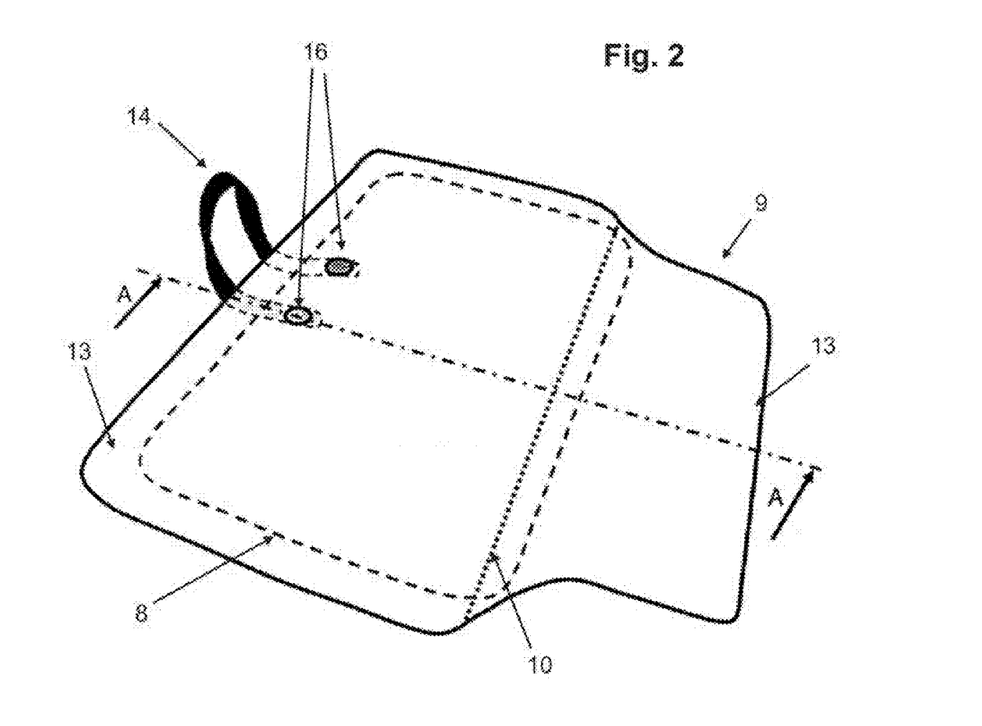
FIG. 2 schematically shows a perspective view of a lid element having a cover and a handle element.

FIG. 2 schematically shows a perspective view of the lid element 8 having the cover 12 and the handle element 14. The cover 12 is implemented in FIG. 2 as a foot mat, which is connected via an area 9, which is like a film hinge, to the wall 4 (not shown here). The cover 12 is connected to the lid element 8 (shown by dashed lines here), so that upon pivoting of the cover 12, the lid element 8 is also pivoted and the access to the cargo space 6 is permitted. For pivoting, the cover 12 has the intended buckling area 10 implemented as an intended buckling line. Because an access via the joint section 11 (not shown here) is not possible due to the overlap part 13, the handle element 14 is connected to the cover 12. The handle element 14 is implemented as a loop and is connected via two connector elements 16 to the cover 12. The connector elements 16 are implemented as clips here, which penetrate at least the cover 12 and the ends of the loop. In present FIG. 2, the connectors 16 may also cause the connection of the cover 12 to the lid element 8, so that lid element 8, cover 12, and handle element 14 are connected to one another jointly via the connectors 16, which have the connectors 15 integrated.

Figure 3:
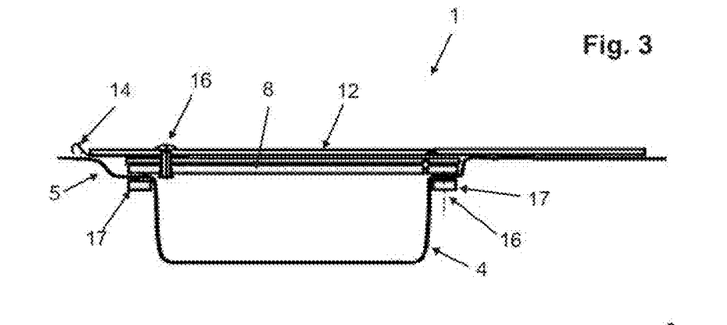
FIG. 3 schematically shows a section along line A-A in FIG. 2.

FIG. 3 schematically shows a section along line A-A in FIG. 2. The cross-section shows the exemplary embodiment according to FIG. 1, the connectors 16 being implemented as a rivet connection. The storage compartment 1 has the trough-shaped wall 4, which is embedded in a motor vehicle floor, so that the lid element 8, which closes the storage compartment 1, terminates flush with the motor vehicle floor. The wall 4 rests at least partially on a supporting frame 17. The lid element 8 is connected via a connector 16 to the wall 4, for example, via a clip, a screw, or the like. Lid element 8, cover 12, and handle element 14 (only partially shown here) are connected to one another via the rivet connection. Various types of connection are shown in FIGS. 5a-5d. The lid element 8 rests on the support area 5, so that the storage compartment 1 is in a closed position. An open position is shown in FIG. 4.

Figures 4, 5A, 5B, 5C, 5D:
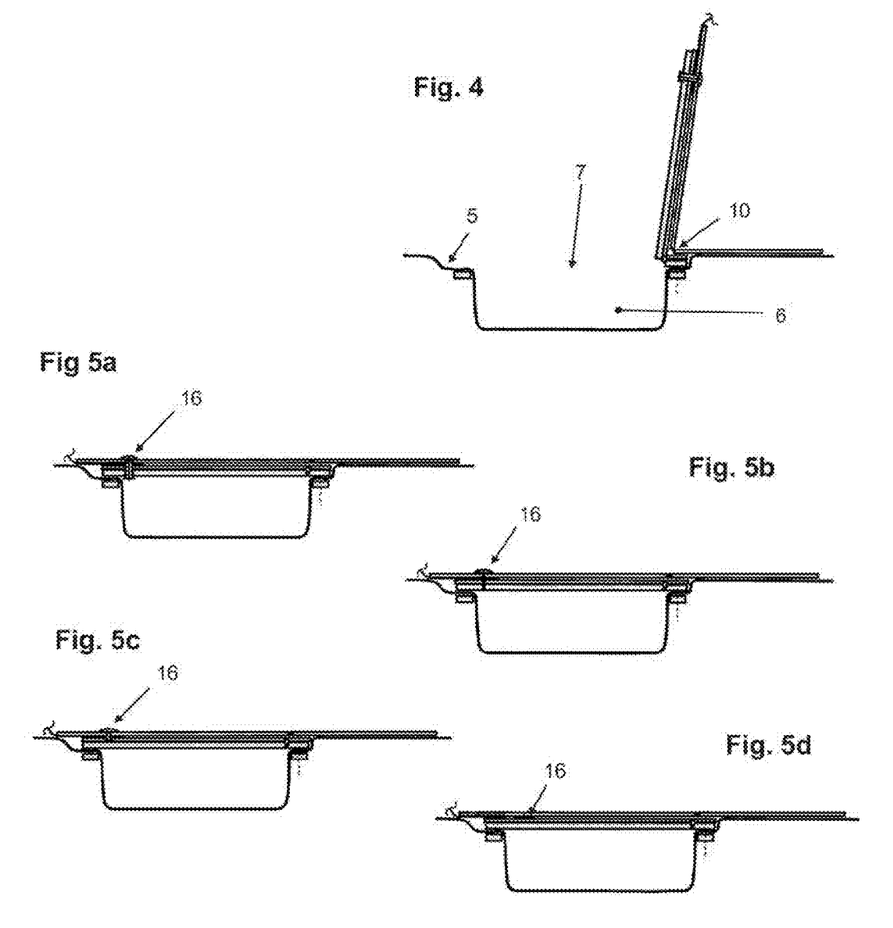
FIG. 4 schematically shows the section from FIG. 3 in an open position.
FIGS. 5a-d schematically shows FIG. 3 with various attachments of the handle element.

FIG. 4 schematically shows the section from FIG. 3 in an open position. The lid element 8 having cover 12 and handle element 14 is pivoted around the intended buckling area 10, so that the support area 5 on the left edge and the access opening 7 are exposed and access to the cargo space 6 is allowed.

FIGS. 5a-d schematically show FIG. 3 with various attachments of the handle element 14, FIGS. 5a-5d only differing through the type of the connectors 16. In FIG. 5a, the connectors 16 are implemented as a rivet connection. In FIG. 5b, the connectors 16 are implemented as a screw connection. FIG. 5c shows the connectors 16 as a pushbutton connection and FIG. 5d shows the connectors 16 as a hook-and-loop tape connection. In addition, the handle element 14 is sewn onto the cover 12 in FIG. 5d.

Figure 6A:
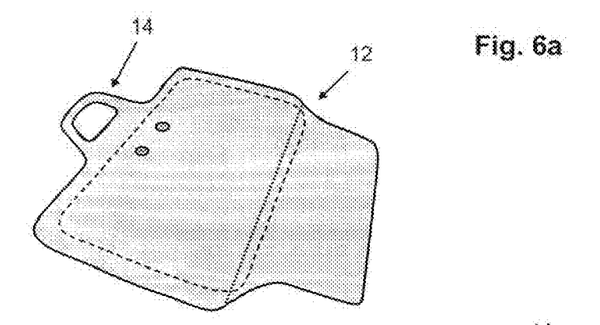
FIGS. 6a-d schematically shows various embodiments of the lid from FIG. 2 in perspective views.
Figure 6B:
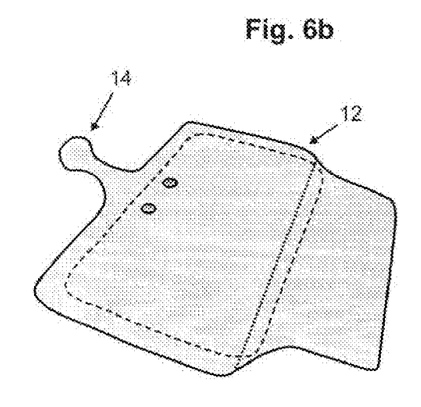
Figure 6C:
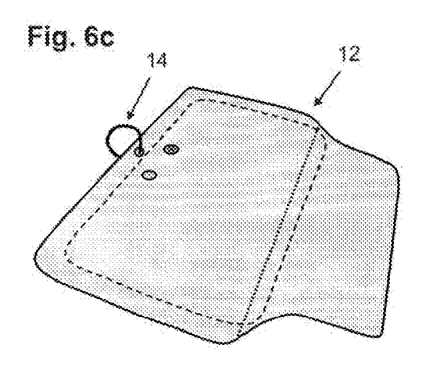
Figure 6D:
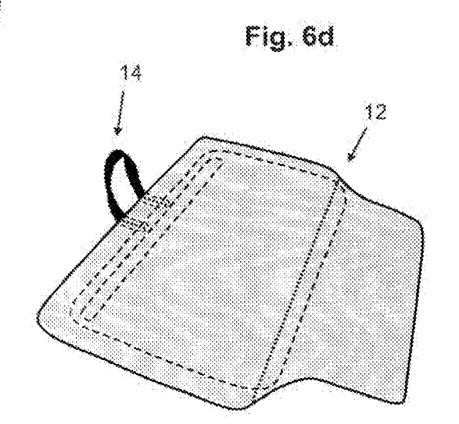

FIGS. 6a-d schematically show various embodiments of the cover 12 from FIG. 2 in perspective views. In FIG. 6a, the handle element 14 is integrated in the cover 12, the handle element 14 forming a type of eye. In FIG. 6b, the handle element 14, which is also implemented as integrated, is implemented as approximately knob-like. FIG. 6c shows the handle element 14 implemented as an annular strip and FIG. 6d shows the handle element as a looped handle.

Figure 7:
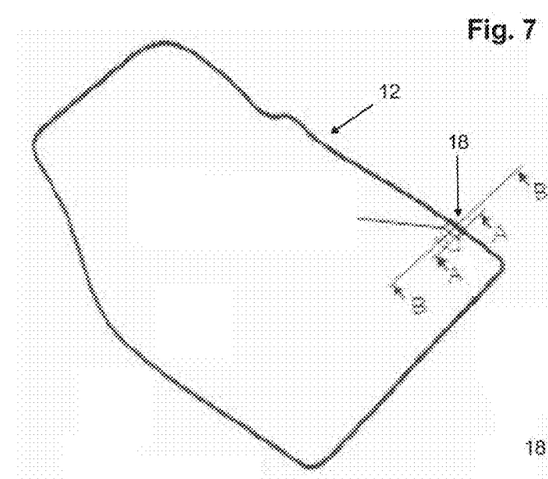
FIG. 7 schematically shows a perspective view of a lid having a holder.

FIG. 7 schematically shows a perspective view of the cover 12 having a holder 18. The holder 18 works positively together with the cover 12 and is used for the slip-proof fastening on the motor vehicle floor or the storage compartment 1. Only one holder 18 is shown as representative of multiple possible holders 18 in FIG. 7, the positions of the holder being able to change correspondingly. The holder is shown in greater detail in FIG. 8.

Figure 8:
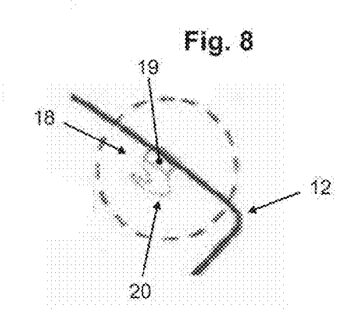
FIG. 8 shows a detail view from FIG. 7.

FIG. 8 shows a detail view according to FIG. 7 with the holder 18. The holder 18 is situated on an edge of the cover 12. The holder 18 has two legs 19 and 20. The legs 19, 20 are preferably implemented in different directions, so that an improved hold of the cover 12 is provided. The leg 19 is preferably implemented as U-shaped, in order to enclose the edge of the cover 12. The other leg 20 is inserted correspondingly through the cover 12, more precisely through a passage opening of the cover (not shown here), in order to work together with the storage compartment 1, for example.

Figure 9A:
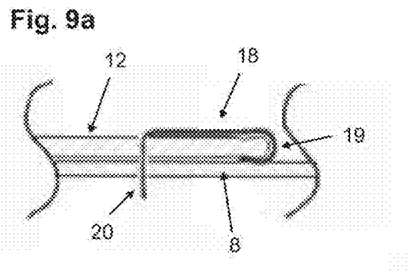
FIG. 9a shows a section A-A from FIG. 7.

FIG. 9a shows a section A-A from FIG. 7. It can be seen clearly therein how the leg 19 is implemented as U-shaped and encloses the edge of the cover 12. The other leg 20 runs approximately vertically, while in contrast the leg 19 runs essentially horizontally. The leg 19 is implemented to pass through a through opening in the cover 12 and be inserted into an opening in the lid element 8 located below the cover 12.

Figure 9B:
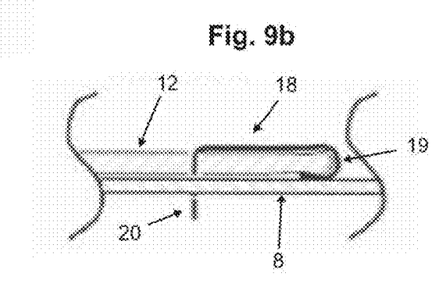
FIG. 9b shows a section B-B from FIG. 7.

FIG. 9b shows a section B-B from FIG. 7, which is slightly offset to section A-A. It may be seen here how the leg 20 penetrates the lid element 8.

Figure 9C:
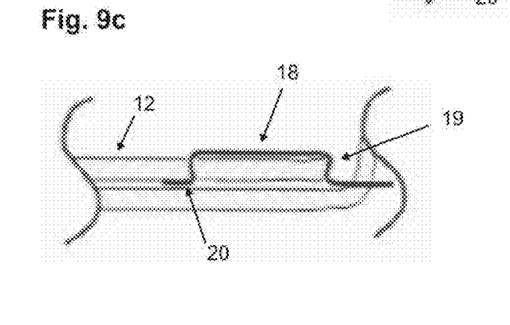
FIG. 9c shows an alternative embodiment of a section from FIG. 9b.

FIG. 9c shows an alternative embodiment of the section from FIG. 9d. The leg 19 enclosing the edge of the cover 12 penetrates a curved area of a component located underneath, such as a motor vehicle floor. The leg 20 penetrates the cover 12, but then runs along adjacent to the motor vehicle floor, without at least partially penetrating it.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A storage compartment for a motor vehicle for stowing objects, comprising:
   a wall defining a storage space and an access opening to the storage space;
   a lid element having a free end unsecured to the wall and a hinged end hinged to the wall;
   the wall having a support area that forms a protrusion and at least partially encloses the access opening such that the free end of the lid element is disposable on the support area in a covering position to form a joint section with the support area to cover the access opening; and
   a means for covering the joint section and adapted to minimize penetration of an object into the joint section;
   wherein the means comprise a cover that is situated on the lid element on a side facing away from the wall;
   wherein the cover is detachably connectable to the lid element via a connector; and
   wherein the connector comprises a holder that is attachable essentially positively to the cover having a floor detent medium.

2. The storage compartment according to claim 1, wherein the wall is cup-shaped.

3. The storage compartment according to claim 1, wherein the wall is trough-shaped.

4. The storage compartment according to claim 1, wherein the means has an overlap part that at least partially covers the joint section in the covering position of the lid element.

5. The storage compartment according to claim 4, wherein the overlap part is integrated in the lid element.

6. The storage compartment according to claim 5, wherein the overlap part is integrated with the cover.

7. The storage compartment according to claim 1, wherein the holder has at least two leg areas that act in essentially opposite directions, in order to implement a secure hold of the cover.

8. The storage compartment according to claim 1, wherein the means comprise a handle element that can be situated protruding from the joint section in order to implement grasping of the lid element essentially without the joint section.

9. The storage compartment according to claim 8, wherein the handle element is connected to the cover.

10. The storage compartment according to claim 8, wherein the handle element is connected to the lid element.

11. The storage compartment according to claim 1, wherein the means is implemented as a film hinge having an intended buckling area.

12. The storage compartment according to claim 1, wherein the means is detachable in order to remove the lid element.

13. The storage compartment according to claim 1, wherein the means is detachable in order to remove the cover from the wall.

* * * * *